United States Patent
Honjo

(10) Patent No.: US 11,810,221 B2
(45) Date of Patent: Nov. 7, 2023

(54) DEVICE, SYSTEM, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tomoya Honjo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 489 days.

(21) Appl. No.: 17/018,330

(22) Filed: Sep. 11, 2020

(65) Prior Publication Data

US 2021/0090206 A1    Mar. 25, 2021

(30) Foreign Application Priority Data

Sep. 20, 2019  (JP) .................................. 2019-171847

(51) Int. Cl.
  *G06T 1/20* (2006.01)
  *G06F 13/12* (2006.01)
  *G06T 7/174* (2017.01)

(52) U.S. Cl.
  CPC .............. *G06T 1/20* (2013.01); *G06F 13/122* (2013.01); *G06T 7/174* (2017.01); *G06T 2207/30242* (2013.01)

(58) Field of Classification Search
  CPC . G06T 1/20; G06T 7/174; G06T 2207/30242; G06F 13/122; H04N 23/617; H04N 23/663
  See application file for complete search history.

(56) References Cited

U.S. PATENT DOCUMENTS

| | | | |
|---|---|---|---|
| 9,946,645 B2 | 4/2018 | Honjo et al. | |
| 10,430,457 B2 | 10/2019 | Honjo | |
| 10,769,800 B2 | 9/2020 | Honjo | |
| 2014/0297989 A1* | 10/2014 | Honjo | G06F 12/0607 711/171 |

(Continued)

FOREIGN PATENT DOCUMENTS

JP    5754316 A    6/2015

OTHER PUBLICATIONS

Redmon, J. et al., "YOLO9000: Better Faster Stronger" Computer Vision and Pattern Recognition (CVPR) arXiv:1612.08242v1 (Dec. 2016) pp. 1-9.

*Primary Examiner* — Christopher M Brandt
(74) *Attorney, Agent, or Firm* — Carter, DeLuca & Farrell LLP

(57) ABSTRACT

A device that can at least store a captured image and is attached/detached to/from an image capturing apparatus which includes a mounting part to/from which the device can be attached/detached is provided. The device has functions of obtaining image data related to an image captured by the image capturing apparatus, executing analysis processing on the image data, storing the image data and a result of the analysis processing on the image data. The device executes control not to store the first result in a case in which a first result of the analysis processing is the same as a second result of previously executed analysis processing that is stored, and to store the first result in a case in which the first result is different from the second result.

13 Claims, 6 Drawing Sheets

(56) References Cited

U.S. PATENT DOCUMENTS

2015/0103081 A1* 4/2015 Bae .................... G09G 5/18
            345/501
2017/0366720 A1* 12/2017 Ebata .................. H04N 5/772
2020/0402197 A1* 12/2020 Nagao ................. G06F 9/5033

* cited by examiner

FIG. 5A
FIG. 5B
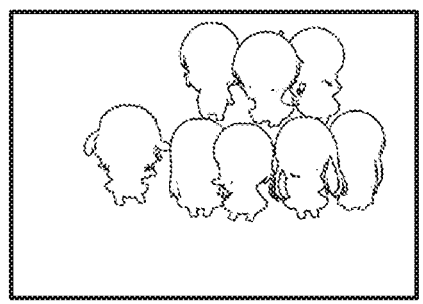
FIG. 5C
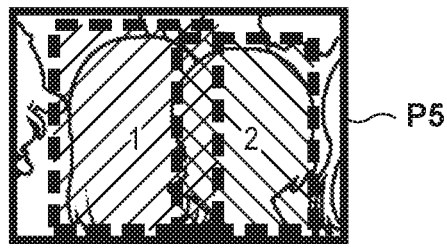

FIG. 5D

| PATCH NUMBER | (n-1)TH FRAME NUMBER OF PERSONS | nTH FRAME NUMBER OF PERSONS |
|---|---|---|
| P1 | 0 | 0 |
| P2 | 1 | 2 |
| P3 | 2 | 1 |
| P4 | 0 | 1 |
| P5 | 3 | 2 |
| P6 | 2 | 2 |
| P7 | 0 | 0 |
| P8 | 0 | 0 |
| P9 | 0 | 0 |

FIG. 5E

| PATCH NUMBER | (n-1)TH FRAME NUMBER OF PERSONS | (n-1)TH FRAME DETECTION POSITION | nTH FRAME NUMBER OF PERSONS | nTH FRAME DETECTION POSITION |
|---|---|---|---|---|
| P1 | 0 | — | 0 | — |
| P2 | 1 | (0.05, 0.7) (0.2, 0.7) | 2 | (0.5, 0.6) (0.95, 0.7) |
| P3 | 2 | 0 | 1 | (0.2, 0.7) |
| P4 | 0 | | 1 | (0.95, 0.1) |
| P5 | 3 | (0.05, 0.1) (0.35, 0.2) (0.6, 0.35) | 2 | (0.35, 0.2) (0.6, 0.35) |
| P6 | 2 | (0.1, 0.2) (0.4, 0.15) | 2 | (0.2, 0.2) (0.5, 0.15) |
| P7 | 0 | — | 0 | — |
| P8 | 0 | — | 0 | — |
| P9 | 0 | — | 0 | — |

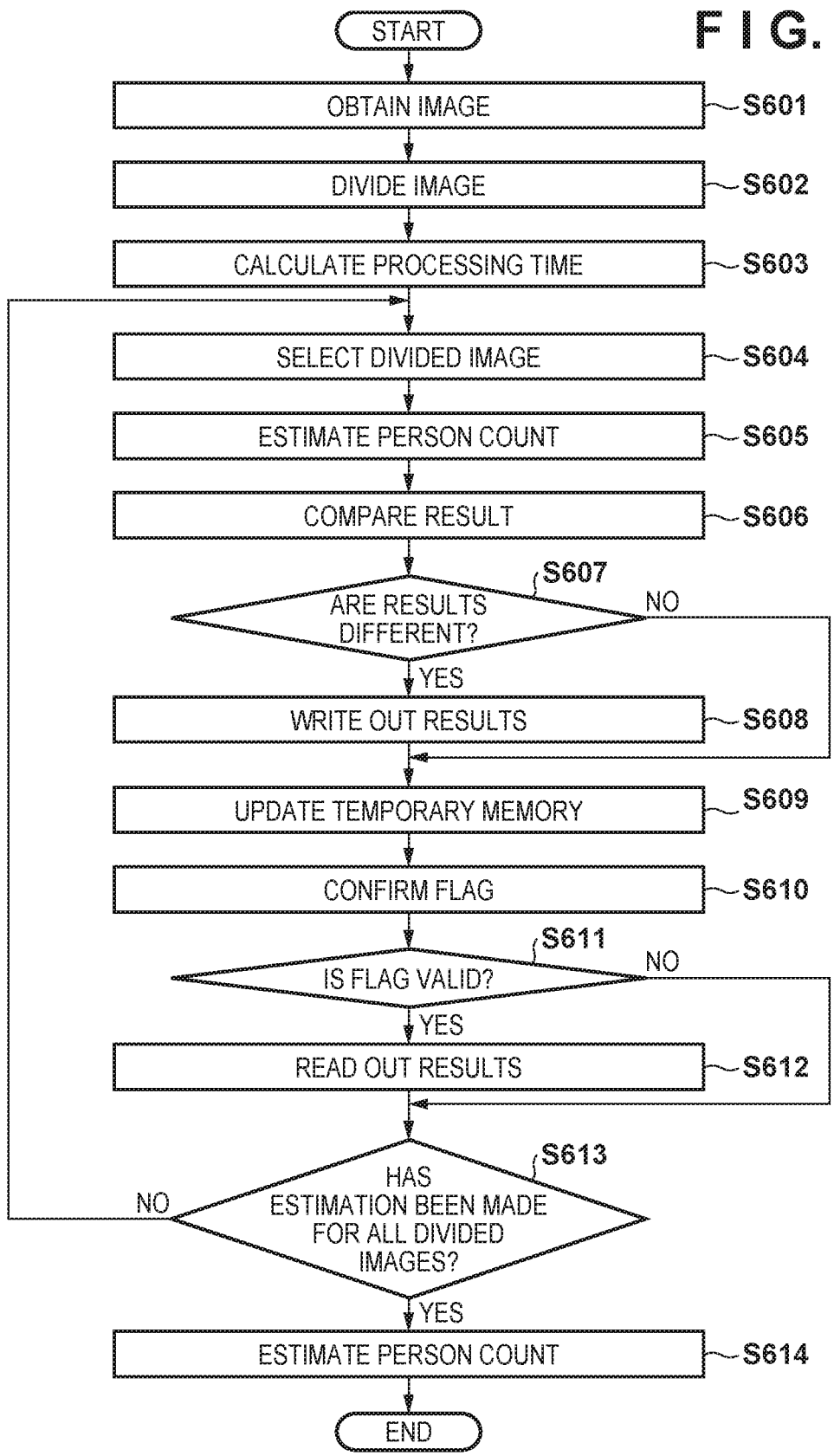

DEVICE, SYSTEM, CONTROL METHOD, AND NON-TRANSITORY COMPUTER-READABLE STORAGE MEDIUM

BACKGROUND OF THE INVENTION

Field of the Invention

The present invention relates to a storage control technique of a device.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

Normally, a detachable device is used as external storage. Hence, by installing an arithmetic apparatus into the detachable device while keeping the function of the device as external storage, image analysis can be executed by this detachable device without degrading user convenience. In a case in which image analysis results are to be stored by using a part of the storage of the detachable device, the number of write operations performed on the storage may increase compared to a case in which the detachable device is used only as external storage. If the storage is a nonvolatile memory area, the probability of the occurrence of a failure will increase as the write operation count increases. To cope with this issue, Japanese Patent No. 5754316 discloses a technique for suppressing write operations by presetting a representative value and preventing a data value which is the same as this representative value from being written. However, if a value different from the preset representative value is continuously obtained as the data value, the write operation suppression effect cannot be sufficiently obtained by the technique disclosed in Japanese Patent No. 5754316.

The present invention provides a technique for reducing the number of accesses to a storage area of a detachable device.

SUMMARY OF THE INVENTION

According to one aspect of the present invention, there is provided a device that can at least store a captured image and is attached/detached to/from an image capturing apparatus which includes a mounting part to/from which the device can be attached/detached, comprising: an obtainment unit configured to obtain image data related to an image captured by the image capturing apparatus; a processing unit configured to execute analysis processing on the image data; a storage unit configured to store the image data and a result of the analysis processing on the image data; and a control unit configured to execute control so as to cause, in a case in which a first result of the analysis processing by the processing unit is the same as a second result of previously executed analysis processing that is stored in the storage unit, the storage unit not to store the first result, and cause, in a case in which the first result is different from the second result, the storage unit to store the first result.

According to another aspect of the present invention, there is provided a system that includes an image capturing apparatus which includes a mounting part to/from which a device which can at least store a captured image can be attached/detached and the device mounted on the image capturing apparatus, wherein the device comprises an obtainment unit configured to obtain image data related to an image captured by the image capturing apparatus, a processing unit configured to execute analysis processing on the image data, a storage unit configured to store the image data and a result of the analysis processing on the image data, and a control unit configured to execute control so as to cause, in a case in which a first result of the analysis processing by the processing unit is the same as a second result of previously executed analysis processing that is stored in the storage unit, the storage unit not to store the first result, and cause, in a case in which the first result is different from the second result, the storage unit to store the first result, and the image capturing apparatus comprises a unit configured to transmit, to the device, the image data related to the image captured by the image capturing apparatus, and a unit configured to obtain the result of the analysis processing stored in the storage unit.

Further features of the present invention will become apparent from the following description of exemplary embodiments (with reference to the attached drawings).

BRIEF DESCRIPTION OF THE DRAWINGS

FIGS. 5A to 5E are views for describing the outline of image analysis processing; and FIG. 6 is a flowchart showing a second example of the processing to be executed in the system.

DESCRIPTION OF THE EMBODIMENTS

Figure 1:
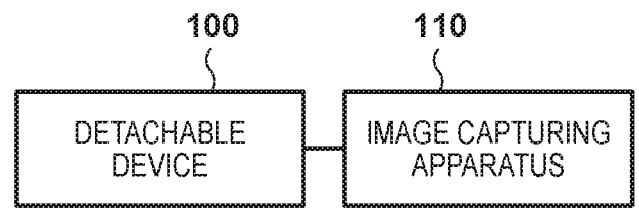
FIG. 1 is a block diagram showing an example of a system arrangement.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

<System Arrangement>

FIG. 1 shows an example of the arrangement of an image analysis system according to this embodiment. As an example, a case in which this system is a person count estimation system that estimates the number of persons in a captured image will be described below. However, the present invention is not limited to this, and the following argument can be applied to an arbitrary system for analyzing an image and performing predetermined information output. This system is configured to include an image capturing apparatus 110 and a detachable device 100. Note that the image capturing apparatus 110 includes a slot to/from which a device capable of recording, for example, a captured image can be attached/detached, and when the detachable device 100 is inserted into the slot, the image capturing apparatus 110 is connected to the detachable device 100.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. Alternatively, the detachable device 100 may be configured such that, for example, a half or more of it can be inserted into the image capturing apparatus 110, and may therefore be configured to be connectable to the image capturing apparatus 110 while making a portion project a little from the image capturing apparatus 110. This can prevent the detachable device 100 from interfering with an obstacle such as a wiring and raise the convenience when using the device. In addition, since an SD card slot is prepared in a lot of existing image capturing apparatus 110 such as a network camera, the detachable device 100 can provide an extension function to the existing image capturing apparatus 110. Note that other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing but may be implemented in another form. Note that in this embodiment, the detachable device 100 estimates the number of persons in an image input from the image capturing apparatus 110, and writes the estimation result in a storage area within the self-device. The details of the technique for estimating the number of persons will be described later.

The image capturing apparatus 110 is an image capturing apparatus such as a network camera that is connected to, for example, a network (not shown) and receives an instruction from another apparatus such as a personal computer (PC) or the like or provides information to the other device via the network. In this embodiment, the image capturing apparatus 110 incorporates an arithmetic apparatus capable of processing a video, but is not limited to this. For example, an external computer such as a PC (Personal Computer) connected to the image capturing apparatus 110 may exist, and the combination may be handled as the image capturing apparatus 110. Additionally, in this embodiment, the detachable device 100 is mounted in every image capturing apparatus 110. Note that although FIG. 1 shows one image capturing apparatus 110 and one detachable device mounted on this image capturing apparatus, the number of combinations of these apparatus and device may be two or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/increased in sophistication by mounting the detachable device 100 including an arithmetic apparatus in the image capturing apparatus 110.

<Apparatus Arrangement>

(Arrangement of Image Capturing Apparatus)

Figure 2:
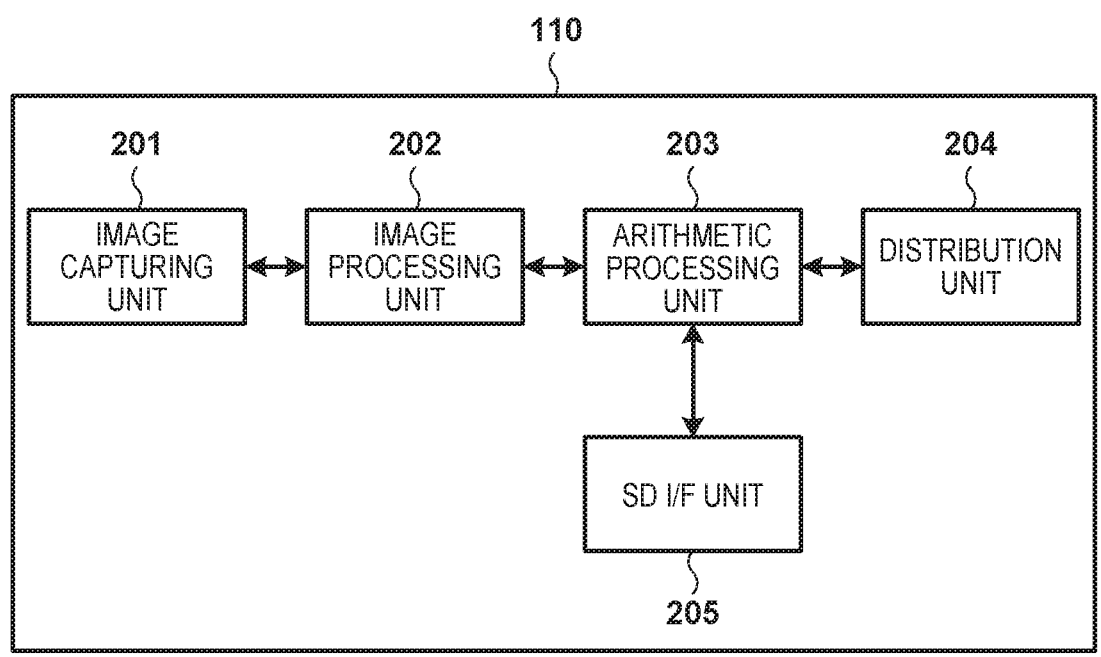
FIG. 2 is a block diagram showing an example of the arrangement of an image capturing apparatus.

The arrangement of the image capturing apparatus 110 will be described next. FIG. 2 is a block diagram showing an example of the arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that IF is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has a gain function of adjusting sensitivity when converting light into an analog signal. These functions are adjusted based on setting values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit setting values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 will selectively execute at least one of analysis preprocessing, analysis processing, and analysis postprocessing on a captured image. In this embodiment, assume that the image capturing apparatus 110 will execute the analysis preprocessing and the detachable device 100 will execute the analysis processing and the analysis postprocessing. The analysis preprocessing is, for example, processing executed on a captured image before the analysis processing is executed. In the analysis preprocessing according to this embodiment, assume that, as an example, processing to create divided images by dividing a captured image will be executed. In this embodiment, arithmetic processing unit 203 will execute the preprocessing among these processing operations, and the analysis processing and the analysis postprocessing will be executed by the detachable device 100. An image received from the image processing unit 202 and has undergone processing by the arithmetic processing unit 203 as needed will be transferred to the distribution unit 204 or the SD I/F unit 205. In addition, data of the processing result will be transferred to, for example, the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result obtained from the arithmetic processing unit 203 into a format distributable to a network (not shown), and outputs the converted data to the network. The SD I/F unit 205 is an interface portion used to connect the detachable device 100, and is configured to include, for example, a power supply, and a mounting part such as an attaching/detaching socket used to attach/detach the detachable device 100. Here, the SD IF unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

(Arrangement of Detachable Device)

Figure 3:
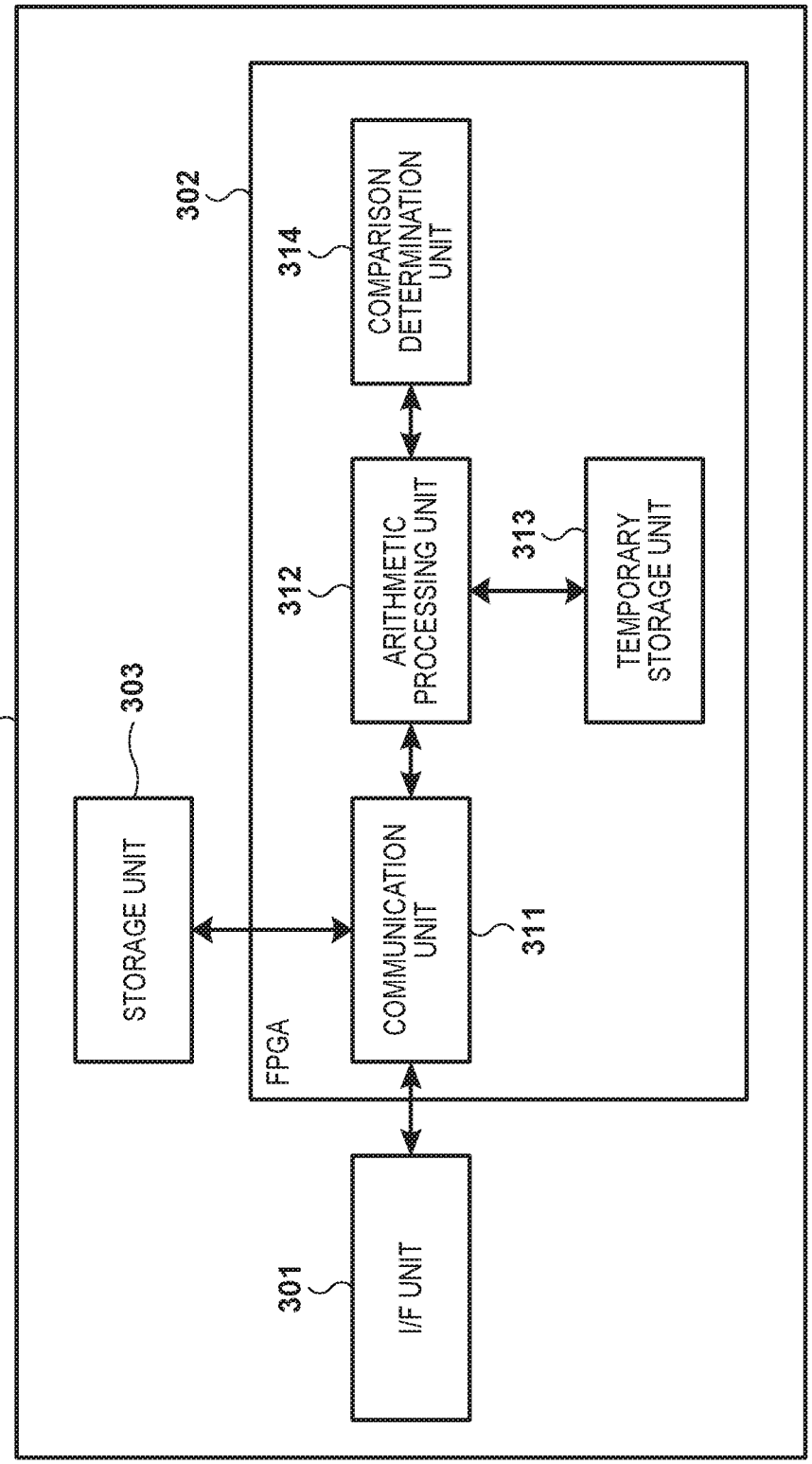
FIG. 3 is a block diagram showing an example of the arrangement of a detachable device.

FIG. 3 shows an example of the arrangement of the detachable device 100. The detachable device 100 includes, as an example, an I/F unit 301, an FPGA 302, and a storage unit 303. The detachable device 100 is formed into a shape that can be inserted/removed into/from the attaching/detaching socket of the SD I/F unit 205 provided in the image capturing apparatus 110, that is, a shape complying with the SD standard.

The IF unit 301 is an interface portion used to connect an apparatus such as the image capturing apparatus 110 and the detachable device 100. The I/F unit 301 is configured to include, for example, an electrical contact terminal that receives supply of power from the image capturing apparatus 110 and generates and distributes a power supply to be used in the detachable device 100, and the like. Concerning items defined in (complying with) the SD standard, the I/F unit 301 complies with that, like the SD I/F unit 205 of the image capturing apparatus 110. Reception of images and setting data from the image capturing apparatus 110 and transmission of data from the FPGA 302 to the image capturing apparatus 110 are executed via the I/F unit 301.

The FPGA 302 is configured to include a communication unit 311, an arithmetic processing unit 312, a temporary storage unit 313, and a comparison determination unit 314. The FPGA 302 refers to a field-programmable gate array and is a kind of semiconductor device capable of repetitively reconstructing an internal logic circuit structure. By processing implemented by the FPGA 302, a processing function can be added (provided) to the apparatus in which the detachable device 100 is mounted. Additionally, since the logic circuit structure can be changed later by the reconstruction function of the FPGA 302, when the detachable device 100 is mounted in, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be executed. The FPGA 302 is activated by writing, from a dedicated I/F, setting data including the information of a logic circuit structure to be generated or reading out the setting data from the dedicated I/F. When powered on, the FPGA 302 reads out the setting data from, for example, the storage unit 303 and generates and activates a logic circuit. However, the present invention is not limited to this. For example, the image capturing apparatus 110 may write the setting data in the FPGA 302 via the F unit 301 by implementing a dedicated circuit in the detachable device.

The communication unit 311 is configured to include a circuit used to transmit/receive an image to/from the image capturing apparatus 110, a circuit that analyzes a command received from the image capturing apparatus 110, a circuit that controls based on a result of analysis, and the like. The communication unit 311 controls so as to transfer an image to the storage unit 303 in the case of storage processing, and transfer an image to arithmetic processing unit 312 in the case of image analysis processing.

The arithmetic processing unit 312 is configured to include a CPU, a RAM, and the drivers of respective I/Fs, and executes analysis processing on each divided image transferred from the communication unit 311. Analysis processing is processing to analyze an input image and output the information obtained from the analysis. The analysis processing according to this embodiment is, as an example, person count estimation processing for estimating the number of persons in each divided image. However, this is merely an example, and another image analysis processing may be executed. The analysis processing can be processing configured to output the position of an object in a divided image using a machine learning model that has learned to detect an object included in an image using, for example, the technique in J. Redmon and A. Farhadi "YOLO9000: Better Faster Stronger" Computer Vision and Pattern Recognition (CVPR) 2016. As a result, the human bodies in the divided images are detected, and the number of persons in the divided images is estimated based on the total number of human bodies that have been detected. The arithmetic processing unit 312 can also execute, for example, at least some of the post-analysis processing. Post-analysis processing is processing to be executed after analysis processing is executed. In the post-analysis processing according to this embodiment, as an example, processing of outputting, as a processing result, a value obtained by summing the numbers of objects detected in each of the divided images based on the analysis processing result of each divided image is executed for each divided image. Note that in this embodiment, assume that the processing time required to estimate the number of persons does not depend on the number of persons, but depends only on the image size, and that the processing time for each image size to be accepted as an input has been stored in a ROM area (not shown). The processing time is a time from the start of the processing to select a processing-target image to a time until the writing of the result in the storage unit 303 is completed, but it may also be a time corresponding to this time.

The temporary storage unit 313 stores the estimated value of the number of persons in each divided image output from the arithmetic processing unit 312. Note that the temporary storage unit 313 may be a storage area such as a RAM or the like included in the arithmetic processing unit 312 or a storage device arranged separately from the arithmetic processing unit 312. The comparison determination unit 314 compares the analysis result of an (n−1)th frame stored in the temporary storage unit 313 with the analysis result of an nth frame output from the arithmetic processing unit 312. In this embodiment, the number of persons estimated in the (n−1)th frame and the number of persons estimated in the nth frame are compared for each divided image. The comparison determination unit 314 will determine whether to store the analysis result of the nth frame in the storage unit 303 in accordance with the comparison result. In this embodiment, as an example, the comparison determination unit 314 will determine to store the number of persons obtained from the analysis result of the nth frame in the storage unit 303 only in a case in which the estimated number of persons of the nth frame is different from the estimated number of persons of the (n−1)th frame. The comparison determination unit 314 is formed as, for example, a part of the arithmetic processing unit 312. In this case, when a new analysis result has been obtained, the arithmetic processing unit 312 will execute control so that the new analysis result will be stored in the storage unit 303 if the new analysis result is different from a corresponding analysis result stored in the temporary storage unit 313.

The storage unit 303 is formed, for example, by a nonvolatile memory, and stores image data (for example, divided images) concerning an image captured by the image capturing apparatus 110 and processing results of image analysis processing by the arithmetic processing unit 312.

Note that in this embodiment, the analysis result of each divided image will always be written in the same storage area of the storage unit 303 (more particularly, in this embodiment, the analysis result will be written under the same file name) for each divided image. For example, assume that a single image will be divided into nine divided images and that numbers P1 to P9 denote the respective divided images. In a case in which a specific divided image is to be designated by using these numbers P1 to Pn hereinafter, this divided image will be referred to as a divided image Pn. The analysis result of the divided image Pn (1≤n≤9) will be stored in a file named Pn.res. That is, for example, the analysis result of a divided image P1 is stored in a file P1.res, and the analysis result of a divided image P2 is stored in a file P2.res. Note that these files may not be present at the point when the analysis processing is started. However, in such a case, a new file will be generated in accordance with the start of the processing. Subsequently, if it is determined from the determination result of the comparison determination unit 314 that the analysis result is to be stored, the analysis result of the file stored at this point is overwritten by the analysis result of the nth frame.

(Procedure of Processing)

An example of the procedure of processing executed by the image capturing apparatus 110 and the detachable device 100 will be described next. The processing to be described below is started, for example, when the image capturing apparatus 110 receives an instruction from a user via an input/output device (not shown).

<First Processing Example>

The first processing example will be described with reference to FIG. 4 and FIGS. 5A to 5E.

First, the image processing unit 202 corrects an image captured by the image capturing unit 201 and outputs the corrected image to the arithmetic processing unit 203 (step S401). Note that this captured image is the nth frame image. FIG. 5A shows an example of the image obtained by the image capturing operation in this case. Next, the arithmetic processing unit 203 divides the input image and creates divided images (step S402). In this embodiment, nine divided images are generated by uniformly dividing the image into thirds in the vertical direction and dividing the image into thirds in the horizontal direction. FIG. 5B shows an example of divided images obtained in this case. Note that although the image is uniformly divided into nine divided images by vertically and horizontally dividing the image into thirds in this case, an arbitrary division method may be employed in accordance with the person count estimation processing or the performance of the FPGA 302. For example, the divided images need not be always generated so no overlapping regions will be present as shown in FIG. 5B, and the divided images may be generated so as to include regions that overlap each other. Note that in FIG. 5B, although the numbers P1 to P9 have been assigned to the respective divided images, these numbers have been assigned for the sake of convenience in designating each divided image. Note that in this embodiment, the size of each image to be input is the same for each frame, and the size of each divided image is also immutable. After the division of the image, the divided images are stored in the storage unit 303 via the SD I/F unit 205, the I/F unit 301, and the communication unit 311. The arithmetic processing unit 203 also calculates, based on the divided image size, the processing time of the person count estimation processing to be performed on all of the divided images by the arithmetic processing unit 312 of the detachable device 100 (step S403). In this embodiment, a processing time (to be denoted by T) corresponding to the divided image size stored in the ROM (not shown) of the detachable device 100 is read out, and a value obtained by multiplying this processing time by the number of divided images is estimated to be the processing time of the person count estimation processing. In this example, the processing time of the person count estimation processing is estimated to be 9 T.

The arithmetic processing unit 312 selects one processing-target divided image from the divided images stored in the storage unit 303 in step S402 (step S404). For example, the arithmetic processing unit 312 will sequentially select a plurality of divided images (for example, in order from P1 to P2, P3, . . . , P9). The process performed when a divided image P5 is selected in step S404 will be described hereinafter. The arithmetic processing unit 312 estimates the number of persons in the image by executing human body detection processing on the divided image selected in step S404 and obtaining a sum of the number of detected human bodies (step S405). For example, an example of human body detection executed in P5 is shown in FIG. 5C. In this case, "2" is obtained as the estimated value of the number of persons in P5 of the nth frame. Subsequently, the comparison determination unit 314 compares the analysis result of the divided image of the (n−1)th frame stored in the temporary storage unit 313 and the analysis result of the corresponding divided image of the nth frame output from the arithmetic processing unit 312 in step S405 (step S406). FIG. 5D shows an example of the analysis results of the divided images of the (n−1)th frame and the nth frame in this case. Since the analysis result of the (n−1)th frame is 3 and the analysis result of the nth frame is 2 in P5 in the example of FIG. 5D, the comparison determination unit 314 determines that the results are different (YES in step S407). If the comparison determination unit 314 has determined that the results are different (YES in step S407), the arithmetic processing unit 312 will store the analysis result obtained in step S405 by overwriting the area of the storage unit 303 associated with the processing-target divided image (step S408). For example, the analysis result obtained in relation to P5 in step S405 is stored by overwriting a corresponding file P5.res present in the storage unit 303. On the other hand, if the comparison determination unit 314 determines that the results are the same (NO in step S407), the arithmetic processing unit 312 advances the process to step S409 without storing the analysis result obtained in step S406. Note that by sequentially executing this processing on the divided images P1 to P9, the analysis results related to the divided images P2 to P5 are stored by overwriting files P2.res to P5.res, respectively, in the storage unit 303 based on FIG. 5D. On the other hand, since the analysis results of the divided images P1 and P6 to P9 are the same as the analysis results stored in the storage unit 303, the overwrite storage operation is not performed.

On the other hand, the comparison determination unit 314 stores the number of persons of each divided image of the nth frame in the temporary storage unit 313 (step S409). In this case, in order to hold the latest result, the analysis result obtained in step S405 is stored in the temporary storage unit 313 regardless of the comparison result. Note that the storage of information in the temporary storage unit 313 in step S409 may also be performed only when an analysis result which is different from the already stored information is obtained. For example, in a case in which the area where the information of each divided image is to be stored is a predetermined area in the temporary storage unit 313, the information to be stored will not change when the analysis result does not change. Thus, an updating operation need not be performed.

In this manner, in this embodiment, write processing is not performed in a case in which the result of the analysis processing executed on a given divided image by the arithmetic processing unit 312 is the same as the result of the analysis processing previously executed on the corresponding image stored in the storage unit 303. Note that although "the analysis processing previously executed" mentioned here can be the analysis processing executed on the (n−1)th frame in a case in which the current processing target is the nth frame, the present invention is not limited to this. For example, in a case in which the same processing result is obtained continuously for a predetermined time or more, the information at the point when this same processing result was first obtained should be stored in the storage unit 303, and the result of analysis processing executed before the (n−1)th frame may be stored in some cases. Note that it can be arranged so that the temporary storage unit 313 will constantly store a processing result obtained one frame before. That is, the contents stored in the temporary storage unit 313 and the contents stored in the storage unit 303 can match, but the timings at which the respective contents were obtained can be different. As a result, for example, in contrast to a conventional arrangement in which a write operation will occur for a hundred times if the same result is obtained for a hundred frames and the same result is to be written each time, only one write operation will occur in the arrangement of this embodiment. Therefore, the write operation count can be reduced, and, for example, the life of the detachable device 100 such as an SD card with a restriction on the information write operation count can be prolonged.

Subsequently, the arithmetic processing unit 312 confirms whether the number of persons has been estimated for all of the divided images (a total of nine images from P1 to P9 in this embodiment) (step S410). If the arithmetic processing unit 312 determines that the person count estimation has been completed for all of the divided images (YES in step S410), the process advances to step S411. If there is a divided image which has not undergone the person count estimation (NO in step S410), the process returns to step S404. In step S411, after the time elapsed from the process of step S403 has reached the value (9T) specified in step S403, the arithmetic processing unit 203 of the image capturing apparatus 110 obtains the processing results (numbers of persons) of all of the divided images of the nth frame. The obtainment of the processing results is performed by reading out, via the SD I/F unit 205, the I/F unit 301, and the communication unit 311, the information stored in the storage unit 303. Subsequently, the arithmetic processing unit 203 integrates the numbers of persons of all of the divided images and outputs the integrated result as the person count estimation result of the nth frame (step S412). Based on FIG. 5D, the estimated number of persons is estimated to be 0+2+1+1+2+2+0+0+0=8 persons in this embodiment.

According to the above-described processing, since the detachable device 100 will store an analysis result in the storage unit 303 only when an analysis result different from the result obtained in an immediately preceding frame is obtained, the number of write operations to the storage unit 303 can be reduced. Since there is a restriction on the number of information rewrite operations in the SD standard, it is possible to prolong the life expectancy in which the detachable device 100 can be used by reducing the number of such write operations.

Note that in the above-described processing example, the comparison determination unit 314 compared the analysis result of the (n−1)th frame stored in the temporary storage unit 313 and the analysis result stored in the nth frame output from the arithmetic processing unit 312. However, this is merely an example, and the comparison determination unit 314 may use a known hash function to execute a comparison based on hash values generated from the respective analysis results. The temporary storage unit 313 can be used more effectively by converting an analysis result into a smaller-sized hash value when the size of the analysis result is large.

In addition, although the person count estimation processing is performed in the above-described processing example, another image analysis processing such as facial authentication or the like may be performed. The processing may also be shared between the image capturing apparatus 110 and the detachable device 100. For example, in a case in which facial authentication is to be executed, extraction of characteristic amounts of the facial region, among the processing operation required for facial authentication, may be performed by the detachable device 100, and the other processing operations may be performed by the image capturing apparatus 110. At this time, the facial regions of a person who is to be facially authenticated can be set as the divided images, and the arithmetic processing unit 312 can extract the characteristic amounts of the facial regions from the respective divided images and output the result. At this time, storage of information into the storage unit 303 can be limited to only a case in which the extracted feature amount differs from the extracted feature amount of the preceding frame. Also, not only images, but data (for example, data obtained from extracting HOG characteristics and the like) obtained by performing processing on the images by the arithmetic processing unit 203 may be input to the detachable device 100. Also, the processing to be executed may be processing to overlay a predetermined masking image or performing mosaic processing on a person detected from an input image for, for example, privacy protection. In addition, the processing to be executed may also be processing that uses a learned model which has learned a specific action of a person by machine learning to detect whether a person in an image is performing the specific action. Furthermore, the processing to be executed may be processing to determine what type of a region has been captured in the image. For example, it may be a processing that determines the type of the region captured in the image by using a learned model which has learned to identify a building, a road, a person, the sky, and the like by machine learning. As described above, the analysis processing that can be executed is applicable to image analysis processing which uses machine learning and to image analysis processing which does not use machine learning.

Furthermore, although the above-described processing example described a case in which the analysis result of each divided image is always stored under the same file name for each divided image, the storage of information may be performed by another mode. For example, the analysis result may always be stored at the same start address or a flag which indicates the number of each divided image can be embedded into the analysis result and the analysis result may be stored by analyzing the flag and specifying an analysis result of the same divided image. Also, although the arithmetic processing unit 203 obtains, at once, the processing results (numbers of persons) of all of the divided images stored in the storage unit 303 as the result of the nth frame, the results may be divided and obtained over a plurality of times or the results of a plurality of frames may be obtained together at once. Although the files of the respective divided images can be obtained by making a plurality of designations at once when the information is to be obtained at once, the information may be obtained by another method. For example, the analysis result of each divided image may be stored at consecutive addresses, and the analysis results may be obtained at once by designating the start address and the data size of each analysis result.

<Second Processing Example>

The second processing example will be described with reference to FIGS. 5A to 5E and FIG. 6. Although the above-described first processing example assumed that the analysis results are present only on the side of the detachable device 100, this processing example will describe a case in which the analysis results are also held on the side of the image capturing apparatus 110.

In the detachable device 100, the arithmetic processing unit 312 also obtains and outputs, as an analysis result, the position of each detected human body. A human body position is obtained when a human body is detected by using the method of J. Redmon and A. Farhadi "YOLO9000: Better Faster Stronger" Computer Vision and Pattern Recognition (CVPR) 2016, for example. In this case, as an example, the center coordinate position of a face will be used as a human body position. The temporary storage unit 313 subsequently stores the number of persons and the detected human body positions output from the arithmetic processing unit 312. The comparison determination unit 314 also compares the number of persons and the human body positions of the (n−1)th frame and the number of persons and the human body positions of the nth frame. A flag indicating whether the information stored in the storage unit 303 has been updated is stored as each comparison result in the storage unit 303. The image capturing apparatus 110 will determine whether the information stored in the storage unit 303 has been updated by confirming these flags, and will decide whether to obtain information from the storage unit 303 based on this determination result. These flags will be described in detail later.

In the image capturing apparatus 110, the arithmetic processing unit 203 will hold the analysis results of the divided images of the (n−1)th frame in a storage device such as a RAM (not shown). Also, the arithmetic processing unit 203 loads, via the SD I/F unit 205, the I/F unit 301, and the communication unit 311, each flag stored in the in the storage unit 303 of the detachable device 100. The arithmetic processing unit 203 reads out, in accordance with each flag, each analysis result of each divided image of the nth frame from the RAM (not shown) in the image capturing apparatus 110 or the storage unit 303 of the detachable device 100.

Figure 4:
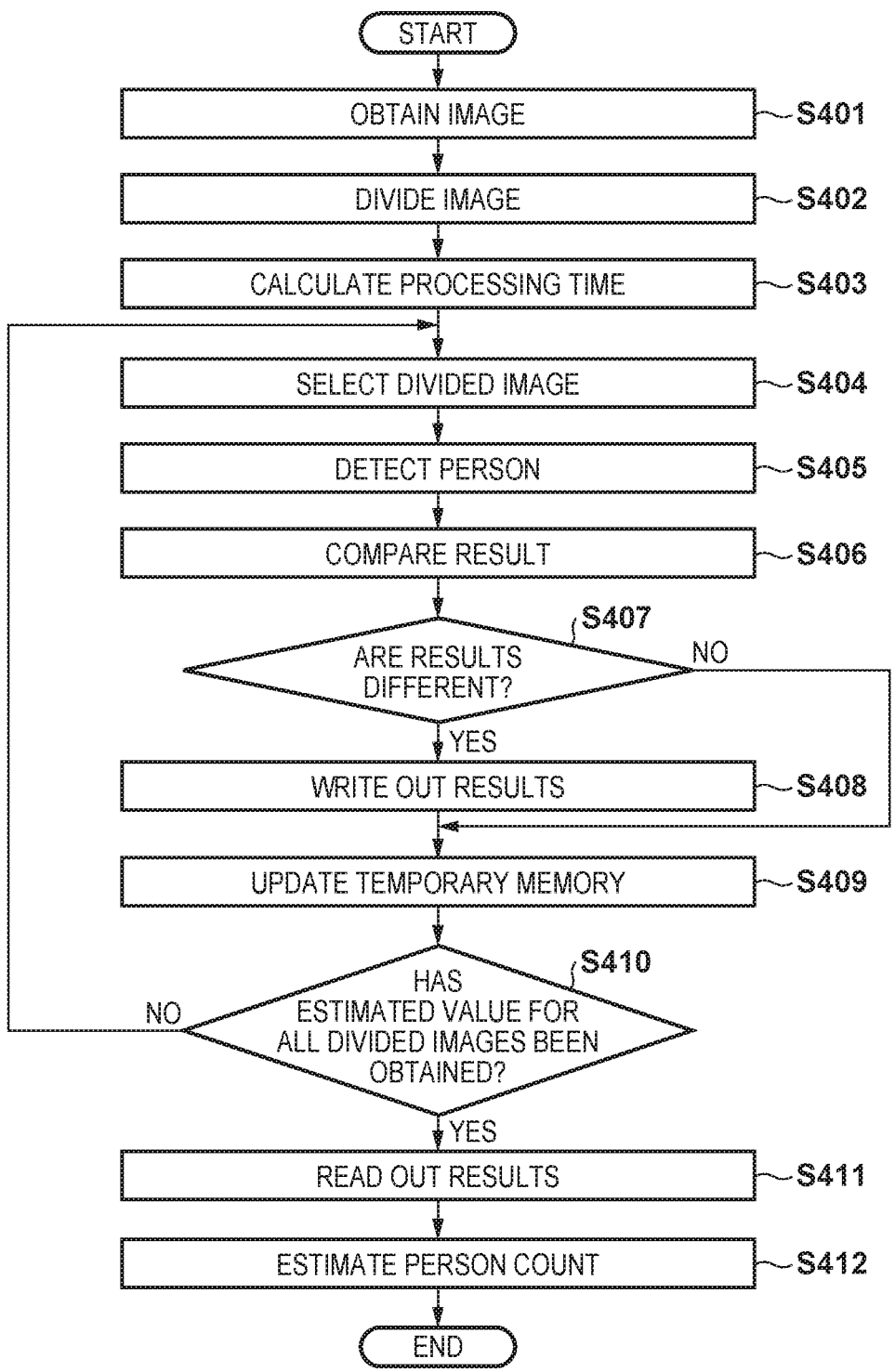
FIG. 4 is a flowchart showing a first example of processing to be executed in the system.

Since the processes from steps S601 to S604 of the processing of FIG. 6 are similar to those of steps S401 to S404 of FIG. 4, a description will be omitted. In step S605, the arithmetic processing unit 312 of the detachable device 100 executes human body detection processing on the divided image selected in step S604. The arithmetic processing unit 312 estimates the number of persons in this divided image by obtaining a sum of the number of detected human bodies. At this time, the arithmetic processing unit 312 also outputs, in a similar manner, the positions where the human bodies were detected.

The comparison determination unit 314 compares the analysis results (FIG. 5E) of each divided image of the (n−1)th frame stored in the temporary storage unit 313 and the analysis results of each divided image of the nth frame output from the arithmetic processing unit 312 in step S605 (step S606). A divided image P6 will be referred in this case. In P6, the number of persons is 2 and the detected positions are (0.1, 0.2) and (0.4, 0.15) in the (n−1)th frame, and the number of persons is 2 and the detected positions are (0.2, 0.2) and (0.5, 0.15) in the nth frame. As a result, the comparison determination unit 314 will determine that the number of persons is the same, but the detected positions are different. Subsequently, the comparison determination unit 314 will generate a flag for each analysis result by setting "0" for a case in which the comparison result has not changed and setting "1" for a case in which the comparison result has changed, and each flag generated flag is stored in the storage unit 303. In this case, the comparison determination unit 314 will generate, for example, with respect to $1 \leq i \leq 9$, a file Pi_num.flag as a flag of the number of persons and a flag Pi_pos.flag as a flag of the detected position, and stores the generated flags in the storage unit 303.

In a case in which the comparison determination unit 314 determines that the result has changed (YES in step S607), the arithmetic processing unit 312 will store the analysis result of the number of persons or the detected positions determined to have changed in the storage unit 303 (step S608). On the other hand, if the comparison determination unit 314 determines that the result has not changed (NO in step S607), the arithmetic processing unit 312 will not store information into the storage unit 303. In this embodiment, based on FIG. 5E, the number of persons of each of P2 to P5 is overwritten and stored in the corresponding one of files P2_num.res to P5_num.res present in the storage unit 303. On the other hand, since the number of persons of each of P1 and P6 to P9 is the same as the value stored in the corresponding one of results P1_num.res and P6_num.res to P9_num.res stored in the storage unit 303, these results are neither overwritten nor saved. In addition, the detected positions of P2 to P6 are overwritten and stored in files P2_pos.res to P6_pos.res present in the storage unit 303. On the other hand, since the detection positions of P1 and P7 to P9 are the same as the results stored in the storage unit 303, the results are neither overwritten nor stored. In this manner, in a case in which the number of persons matches but the detection positions do not match, for example, as in the case of the divided image P6, only the information of the detection positions will be overwritten, and the information of the number of persons will not be overwritten. That is, only the information that has changed will be rewritten. As a result, the write operation count can be suppressed. The comparison determination unit 314 stores, in the temporary storage unit 313, the number of persons and the detection positions of these persons in the nth frame of the divided image that is being currently processed.

The arithmetic processing unit 203 of the image capturing apparatus 110 reads out, from the storage unit 303, the flag corresponding to the divided image that is being currently processed, and confirms the contents of the flag of the number of persons and the flag of the detection positions (step S610). If 1 is set in the read out flag (YES in step S611), that is, if there is a change in the number of persons or the detection positions, the arithmetic processing unit 203 will execute the readout of the processing result of the divided image that is being currently processed (step S612). For example, after calculation of the processing time is completed in step S603 and the processing time T corresponding to one divided image obtained from this calculation has elapsed, the arithmetic processing unit 203 will read out the information from the storage unit 303 of the detachable device 100. Subsequently, the arithmetic processing unit 203 obtains, as the result of the nth frame, the processing result (the number of persons or the detection positions) whose flag indicates 1 of the divided image that is being currently processed stored in the storage unit 303, and stores the obtained result in the RAM (not shown). On the other hand, if 0 is set in the read out flag 0 (NO in step S611), that is, if there is no change in the number of persons or the detected positions, the arithmetic processing unit 203 does not execute the readout of the results. In this case, the previously read out result corresponding to the divided image that is being currently processed will be directly used as the result of the current processing.

Subsequently, whether the estimated values of the number of persons and the detection positions have been obtained for all of the divided images (the total of nine images from P1 to P9 in this embodiment) is checked (step S613). If the estimated values of all of the divided images have been obtained (YES in step S613), the arithmetic processing unit 203 will integrate the numbers of persons of all of the divided images and output the result as the person count estimation result of the nth frame (step S614) and end the processing. Note that the arithmetic processing unit 203 may output, for example, the information of the detected positions to an input/output device (not shown), and the input/output device may notify the user of the positions where the persons appear in a video by displaying the corresponding information on a screen or the like. On the other hand, if the estimated values of all of the divided images have not been obtained (NO in step S613), the process will return to step S604.

As described above, in the second processing example, if the analysis result does not change from that of the preceding frame, the data of this analysis result will not be transferred from the detachable device 100 to the image capturing apparatus 110. As a result, the number of write operations performed on the storage unit 303 can be reduced as much as possible and the data transfer amount between the image capturing apparatus 110 and the detachable device 100 can be suppressed.

In the above-described second processing example, the arithmetic processing unit 203 held the analysis results of the divided images of the (n−1)th frame in the RAM (not shown), however the analysis results may be stored in arbitrary location. For example, the analysis results may be held in a storage device such as an external HDD or the like. In addition, although the above-described processing example described a case that uses a flag in which 0 is stored when the comparison result has not changed and 1 is stored when the comparison result has changed, an arbitrary method that can discriminate whether the information stored in the storage unit 303 has been updated may be used. Furthermore, although the above-described second processing example described a case in which the number of persons and the detection positions are stored as separate output results, these results may be integrated and stored. In such a case, the flag will also reflect the result obtained by performing a comparison operation on the integrated output result. Also, although a case that uses analysis processing operations to specify the number of persons and the detection positions has been described, these analysis processing operations are merely examples, and other analysis processing operations may be performed. The two or more types of analysis results obtained by these analysis processing operations may be stored as separate pieces of information for each type or the plurality of types of analysis results may be integrated and stored. Storing the analysis result for each type will prevent an analysis result with few changes from being overwritten frequently in accordance with the changes in other analysis results. On the other hand, integrating the plurality of types of analysis results and storing an integrated analysis result will reduce the number of files and simplify, for example, the loading operation by the image capturing apparatus 110.

In addition, although the second processing example showed an example in which the image capturing apparatus 110 confirms the flag and determines whether the information of the number of persons and the detection positions is to be obtained for each processing performed on a single divided image, this determination may be performed each time the processing of all of the divided images has ended. In this case, the image capturing apparatus 110 will confirm the flags of all of the divided images at once and confirm the divided image from which information is to be obtained. At this time, for example, a piece of information indicating the presence/absence of change related to all of the divided images may be held. For example, when an analysis result of a processing-target divided image is obtained, the information of a corresponding portion in the held piece of information can be rewritten based on this analysis result and the analysis result of the same divided image of the preceding frame. Also, the analysis results of all of the divided images of the nth frame may be stored together with previous analysis results, and the comparison determination unit 314 may compare these analysis results at once and generate a piece of information indicating whether there has been a change in each divided image. In this case, the image capturing apparatus 110, by acquiring one piece of information, can determine the divided image from which information is to be read out. As a result, the image capturing apparatus 110 can read out information that has changed, but not read out information that has not changed. Also, in this case, since the image capturing apparatus 110 will need not read out the flag information each time processing is performed on a divided image, the number of accesses to the detachable device 100 can be reduced.

Furthermore, the image capturing apparatus 110 may load the information of the analysis results for each divided image, for all of the divided images at once, or for each predetermined number of divided images. For example, the information of the analysis results may be read out for each column or each row of divided images or, for example, the information of the analysis results of m divided images may be read out each time the analysis processing of the m divided images has ended. As a result, the number of accesses performed by the image capturing apparatus 110 to load the analysis results can be reduced.

Note that although the above-described processing examples described a case in which a plurality of divided images are obtained by dividing a captured image, the image need not be divided. That is, similar processing operations can be executed on the captured image itself. In this case, it may be set so information will not be written into the storage unit 303 if the result of the analysis processing on the captured image matches the analysis result of the immediately preceding frame. As a result, the data of a plurality of analysis results need not be read out from, for example, an image whose state barely changes, and the number of accesses from the image capturing apparatus 110 to the detachable device 100 can be reduced. Note that since the captured image can be divided to allow recognition of change in each divided image, the user can be notified of detailed information indicating the region in which the image the change has occurred.

In the above-described embodiment, image analysis processing has been described as an example of analysis processing. However, the present invention is also applicable to sound analysis processing. For example, the present invention can be applied to processing of detecting a sound pattern such as a scream, a gunshot, or glass breaking sound. For example, a characteristic amount of a sound is extracted by various sound data analysis methods such as spectrum analysis and compared with the detected sound pattern. By calculating the degree of matching, a specific sound pattern can be detected.

When performing sound analysis processing, sound data is divided into sound data of a predetermined time, sound analysis processing is performed using the sound data of the predetermined time as a unit. In addition, the predetermined time appropriately changes depending on the sound pattern of the detection target. For this reason, sound data of a time corresponding to a sound pattern to be detected is input to the detachable device 100. The detachable device 100 has a function of analyzing the input sound data or a function of holding the input sound data.

In the above-described embodiment, the detachable device 100 capable of non-temporarily storing data input from the image capturing apparatus 110 has been described as an example. However, in some embodiments, the detachable device 100 that cannot non-temporarily store data input from the image capturing apparatus 110 may be used. That is, the detachable device 100 may only perform analysis processing for data input from the image capturing apparatus 110, and may not non-temporarily store the data. In other words, the detachable device 100 can be arranged to be a device only for analysis processing instead of a device for storing data like a normal SD card.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-171847, filed Sep. 20, 2019 which is hereby incorporated by reference herein in its entirety.

What is claimed is:

1. A device that can at least store a captured image and is attached/detached to/from an image capturing apparatus which includes a mounting part to/from which the device can be attached/detached, comprising:
   one or more processors; and
   one or more memories storing executable instructions which, when executed by the one or more processors, cause the device to perform operations including:
   obtaining image data related to an image captured by the image capturing apparatus;
   executing analysis processing on the image data;
   storing the image data and a result of the analysis processing on the image data in the one or more memories; and
   executing control so as to cause, in a case in which a first result of the executed analysis processing is the same as a second result of previously executed analysis processing that is stored in the one or more memories, the first result not to be stored, and cause, in a case in which the first result is different from the second result, the first result to be stored.

2. The device according to claim 1, wherein whether the first result is the same as the second result by comparing a hash value of the first result and a hash value of the second result is determined.

3. The device according to claim 1, wherein in a case in which the first result is stored, the second result is overwritten with the first result.

4. The device according to claim 1, wherein the instructions cause the device to perform further operations including:
   outputting the result of the analysis processing stored in the one or more memories to the image capturing apparatus.

5. The device according to claim 1, wherein the image data is data of a plurality of divided images obtained by dividing the image captured by the image capturing apparatus, the analysis processing is executed on each of the plurality of divided images, the second result of the analysis processing of each of the plurality of divided images is stored in the one or more memories, and whether to cause the first result to be stored by determining whether the first result of each of the plurality of divided images is the same as the second result of a corresponding divided image.

6. The device according to claim 5, wherein the result of the analysis processing stored in the one or more memories is output to the image capturing apparatus for each of a predetermined number of divided images among the plurality of divided images.

7. The device according to claim 1, wherein, for each type, not less than two types of processing results that indicate the result of the executed analysis processing are separately stored.

8. The device according to claim 1, wherein not less than two types of processing results that indicate the result of the executed analysis processing are integrated and stored.

9. The device according to claim 1, wherein information that indicates whether the stored second result has been updated is further stored in the one or more memories, and the information is used to decide whether the image capturing apparatus is to read out the second result stored in the one or more memories.

10. The device according to claim 1, wherein the device is in the form of an SD card.

11. A system that includes an image capturing apparatus which includes a mounting part to/from which a device which can at least store a captured image can be attached/detached and the device mounted on the image capturing apparatus, wherein the device comprises:

one or more processors; and one or more memories storing executable instructions which, when executed by the one or more processors, cause the device to perform operations including:

obtaining image data related to an image captured by the image capturing apparatus, executing analysis processing on the image data, storing the image data and a result of the analysis processing on the image data in the one or more memories, and executing control so as to cause, in a case in which a first result of the executed analysis processing is the same as a second result of previously executed analysis processing that is stored in the one or more memories, the first result not to be stored, and cause, in a case in which the first result is different from the second result, the first result to stored, and the image capturing apparatus comprises:

one or more other processors; and one or more other memories storing executable instructions which, when executed by the other one or more processors, cause the device to perform operations including:

transmitting, to the device, the image data related to the image captured by the image capturing apparatus, and obtaining the result of the analysis processing stored in the one or more other memories.

12. A control method that is executed by a device that can at least store a captured image, is attached/detached to/from an image capturing apparatus which includes a mounting part to/from which the device can be attached/detached, and includes one or more memories for storing image data related to an image captured by the image capturing apparatus and a result of analysis processing on the image data, the method comprising:

obtaining the image data;

executing the analysis processing on the image data; and executing control so as to cause, in a case in which a first result of the analysis processing is the same as a second result of previously executed analysis processing that is stored in the one or more memories, the first result not to be stored, and cause, in a case in which the first result is different from the second result, the first result to be stored.

13. A non-transitory computer-readable storage medium storing a program for causing a computer that includes a device which can at least store a captured image, is attached/detached to/from an image capturing apparatus which includes a mounting part to/from which the device can be attached/detached, and includes one or more memories for storing image data related to an image captured by the image capturing apparatus and a result of analysis processing on the image data, to obtain the image data;

execute the analysis processing on the image data; and execute control so as to cause, in a case in which a first result of the analysis processing is the same a second result of previously executed analysis processing that is stored in the one or more memories, the first result not to be stored, and cause, in a case in which the first result is different from the second result, the first result to be stored.

* * * * *